United States Patent
Takeshita et al.

(10) Patent No.: US 8,230,883 B2
(45) Date of Patent: Jul. 31, 2012

(54) GAS PIPING SYSTEM FOR FUEL CELL

(75) Inventors: Masahiro Takeshita, Toyota (JP);
Shigeyuki Inoue, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 455 days.

(21) Appl. No.: 12/516,959

(22) PCT Filed: Nov. 7, 2007

(86) PCT No.: PCT/JP2007/072041
§ 371 (c)(1),
(2), (4) Date: May 29, 2009

(87) PCT Pub. No.: WO2008/065884
PCT Pub. Date: Jun. 5, 2008

(65) Prior Publication Data
US 2010/0021795 A1 Jan. 28, 2010

(30) Foreign Application Priority Data
Dec. 1, 2006 (JP) .................................. 2006-325849

(51) Int. Cl.
*F16L 3/10* (2006.01)
(52) U.S. Cl. .......... 137/899; 137/797; 251/368; 248/65; 248/74.1; 248/74.4
(58) Field of Classification Search .................. 137/351, 137/354, 899, 797; 180/89.2, 309; 248/49, 248/62, 65, 72, 73, 74.1, 74.2, 74.3, 74.4, 248/74.5; 251/368
See application file for complete search history.

(56) References Cited

U.S. PATENT DOCUMENTS

| | | | | |
|---|---|---|---|---|
| 4,899,965 A | * | 2/1990 | Usui | 248/68.1 |
| 4,909,462 A | * | 3/1990 | Usui | 248/74.1 |
| 5,111,561 A | * | 5/1992 | Nakagawa et al. | 29/4.55 |
| 5,649,685 A | * | 7/1997 | Keller | 248/638 |
| 5,890,685 A | * | 4/1999 | Takahashi | 248/74.3 |
| 6,173,926 B1 | * | 1/2001 | Elvegaard | 248/74.1 |
| 6,186,452 B1 | * | 2/2001 | Zearbaugh et al. | 248/74.4 |
| 6,726,166 B2 | * | 4/2004 | Goodman | 248/229.14 |
| 6,834,900 B2 | * | 12/2004 | Wright | 296/1.01 |

(Continued)

FOREIGN PATENT DOCUMENTS
JP 56-91973 U 7/1981
(Continued)

OTHER PUBLICATIONS
Machine Translation of JP 8326966.*
(Continued)

Primary Examiner — Stephen M Hepperle
Assistant Examiner — Kevin Murphy
(74) Attorney, Agent, or Firm — Kenyon & Kenyon LLP (57) ABSTRACT

There is provided a gas piping system for a fuel cell in which a gas pipe is made of stainless steel containing no nickel and is fixed at normal room temperature to a suspension member or a fixing portion through a fixing tool by means of bolts/nuts. The fixing tool is constituted to include a bracket member and an elastic member, and this elastic member is arranged between the bracket member and the gas pipe. Moreover, the fixing tool is equipped with a notched portion such that the fixing tool may be self-ruptured when an excessive external force is applied to a fuel cell stack constituting a fuel cell system.

17 Claims, 5 Drawing Sheets

U.S. PATENT DOCUMENTS

| | | | |
|---|---|---|---|
| 2001/0047897 A1* | 12/2001 | Steenackers et al. | 180/89.2 |
| 2003/0106968 A1* | 6/2003 | Terrill et al. | 248/58 |
| 2004/0126640 A1* | 7/2004 | Sanderson | 429/34 |
| 2005/0061927 A1* | 3/2005 | Schaty | 248/74.4 |
| 2005/0211348 A1* | 9/2005 | Miyazaki et al. | 148/609 |
| 2006/0113145 A1* | 6/2006 | Toyoshima et al. | 181/268 |

FOREIGN PATENT DOCUMENTS

| | | |
|---|---|---|
| JP | 57-5581 U | 1/1982 |
| JP | 08-326966 A | 12/1996 |
| JP | 2002-313404 A | 10/2002 |
| JP | 2004-214193 A | 7/2004 |
| JP | 2005-213542 A | 8/2005 |

OTHER PUBLICATIONS

"Metal Data Book: Comparison Tables of Japanese, U.S., U.K., German, and French Standards", second revised edition, Japan Standards Association, Oct. 18, 1985, pp. 176-177.

http://www.forming.co.jp/database/db/ssb-1.pdf, Stainless Steel Bars, 1998, 4 pages and partial translation.

Office Action issued Apr. 21, 2011 in Chinese Patent Application No. 200780044444.3 and English translation thereof.

* cited by examiner

GAS PIPING SYSTEM FOR FUEL CELL

This is a 371 national phase application of PCT/JP2007/072041 filed 7 Nov. 2007, claiming priority to Japanese Patent Application No. JP 2006-325849 filed 1 Dec. 2006, the contents of which are incorporated herein by reference.

TECHNICAL FIELD

The present invention relates to gas piping systems for fuel cells, and in particular, relates to a gas piping system for a fuel cell including a gas pipe for connecting components that constitute a fuel cell system.

BACKGROUND ART

Installation of a fuel cell in a vehicle has been practiced because the fuel cell has low environmental impact. In a fuel cell, for example, a fuel gas such as hydrogen is supplied to an anode side of a fuel cell stack, while an oxidation gas including oxygen such as, for example, air is supplied to a cathode side of the fuel cell stack, to thereby cause an electrochemical reaction through an electrolytic film and extract necessary power from the electrochemical reaction. Water is then produced by the electrochemical reaction on the cathode side. The produced water is contained in a spent oxidation gas on the cathode side and delivered to the outside. Further, the produced water penetrates the electrolytic film into the anode side, and the penetrated produced water is included in a spent fuel gas and discharged to the outside.

Although a solid polymer membrane, for example, is used as the electrolytic film, in some cases fluorine or the like, which is a constituent element of the solid polymer membrane, may be extracted into the produced water. As a result, highly corrosive ions such as fluorine ions are produced, which may sometimes cause corrosion of a gas pipe and the like.

For example, JP 2002-313404A addresses such a corrosion problem, and discloses that ions discharged from a solid polymer membrane are captured by providing a first ion removal unit in at least a pipe, among fuel gas discharge pipes and oxidizing gas discharge pipes, through which produced water is discharged, providing a second ion removal unit in a fuel gas humidifier and an oxidizing gas humidifier, providing a third ion removal unit in at least one of a fuel gas humidifier side of a cooling water feeding pipe and an oxidation gas humidifier side of a circulation pipe, providing a fourth ion removal unit in both a location in a mid-point of a cooling water bypass pipe and a location in a mid-point of a circulating water bypass pipe. Here, the ion removal units include ion-exchange resin.

Other than ion removal as described in JP 2002-313404A, corrosion resulting from fluorine ions or the like may be addressed by forming pipes using a material having high corrosion resistance such as, for example, stainless steel. However, because austenitic stainless steel contains, as one of its components, nickel, and the nickel may be, in some cases, eluted by the fluorine ions, it becomes necessary to suppress an amount of nickel emission in compliance with emission standards when the produced water is discharged. With this in mind, it is conceivable to use ferritic stainless steel which does not include nickel, such as JIS SUS 436 stainless steel, for example.

On the other hand, a gas pipe itself is welded and fixed to a fixing portion to ensure that the gas pipe is securely fixed so as not to cause gas leakage or the like. Although a brazing technique may be used for the welding, processing at a certain level of high temperatures is needed for such a welding technique. When the ferritic stainless steel is processed at high temperatures, Cr is combined with C at a grain boundary, thereby precipitating chromium carbide, and the content of Cr is accordingly reduced in the vicinity of the grain boundary. Therefore, high-temperature processing of ferritic stainless steel is known to cause the ferritic stainless steel to become sensitive to corrosion. Because it is likely that the occurrence of such sensitization will result in grain boundary corrosion, the fixing method which needs high-temperature processing has a problem to be solved.

As described above, it is difficult to ensure compatibility between high resistance to corrosion caused by fluorine ions contained in produced water and a method for fixing a gas pipe in a gas piping system for a fuel cell.

The present invention advantageously provides a gas piping system for a fuel cell in which both high corrosion resistance and pipe fixing robustness can be implemented.

DISCLOSURE OF THE INVENTION

A gas piping system for a fuel cell according to the present invention has a characteristic feature of comprising a gas pipe formed of stainless steel containing no nickel component, and a fixing tool for fixing the gas pipe to a fixing portion at normal room temperature.

Further, it is preferable that the gas piping system for a fuel cell according to the present invention comprises an elastic member disposed between the gas pipe and the fixing tool.

It is also preferable that, in the gas piping system for a fuel cell according to the present invention, the gas pipe has a connection end which is connected to a component of a fuel cell system and configured to have an offset between a connecting location of the connection end and a location of the fixing tool, and the fixing tool includes a notched portion which can be ruptured by an external force when the external force is applied to the connection end of the gas pipe.

According to the above-described structure, the gas pipe is formed of stainless steel containing no nickel component, and fixed to the fixing portion at normal room temperature using the fixing tool. As a method for performing the fixing to the fixing portion at normal room temperature using the fixing tool, for example, a way of fixing the gas pipe to the fixing portion with bolts/nuts or the like while tightly holding the gas pipe using an appropriate bracket, or other ways, may be used. As a result, because inclusion of nickel into the produced water can be avoided, while preventing nickel-free stainless steel from undergoing high-temperature processing, the possibility of causing grain boundary corrosion can be reduced.

Moreover, because the elastic member disposed between the gas pipe and the fixing tool is installed, the gas pipe can be stably fixed to the fixing portion. In addition, when the gas pipe is subjected to an external force, the external force is absorbed by the elastic member, which can contribute to improvement of impact resistance.

Further, the offset is provided between the location of the connection end of the gas pipe and the location of the fixing tool. Therefore, when the external force is exerted on the component of the fuel cell system, a bending moment is applied between the fixing tool and the connection end where the external force is received. Then, because the fixing tool is able to be ruptured from the notched portion by the external force, the fixing tool can be self-ruptured when an excessive external force is exerted, to thereby protect the gas pipe from damage.

DESCRIPTION OF EXEMPLARY EMBODIMENTS

With reference to drawings, a preferred embodiment of the present invention will be described in detail below. Although a system comprising a fuel cell stack, an air compressor (ACP), a humidifier, a diluting device, and other components will be illustrated as a fuel cell system in the description below, the components are listed for explaining a gas piping system, and components other than those listed above such as, for example, various types of control valves, various sensors, or a cooling water system may, of course, be contained in the fuel cell system. Further, although a gas pipe for mutually connecting the fuel cell stack, the air compressor (ACP), and the humidifier will be illustrated below, the gas pipe may be used for connecting components other than those listed above. For example, the gas pipe may be a gas pipe disposed between a fuel gas source and the fuel cell stack, a gas pipe used for various bypasses, or the like. Still further, although a gas piping system for a fuel cell installed under a floor of a vehicle will be illustrated below, a site of the installation is not limited to a location under the floor of the vehicle, and may be installed in another location such as, for example, an engine room or a rear portion of the vehicle. Moreover, the gas piping system may not necessarily be designed for use in a mobile, vehicle-mounted fuel cell, and, for example, the gas piping system may be used for a fixed stationary fuel cell. In addition, materials, shapes, or other features of the fixing tool which will be described below are disclosed by way of illustration, and may be appropriately changed depending on the gas piping system to which the fixing tool is applied.

Figure 1:
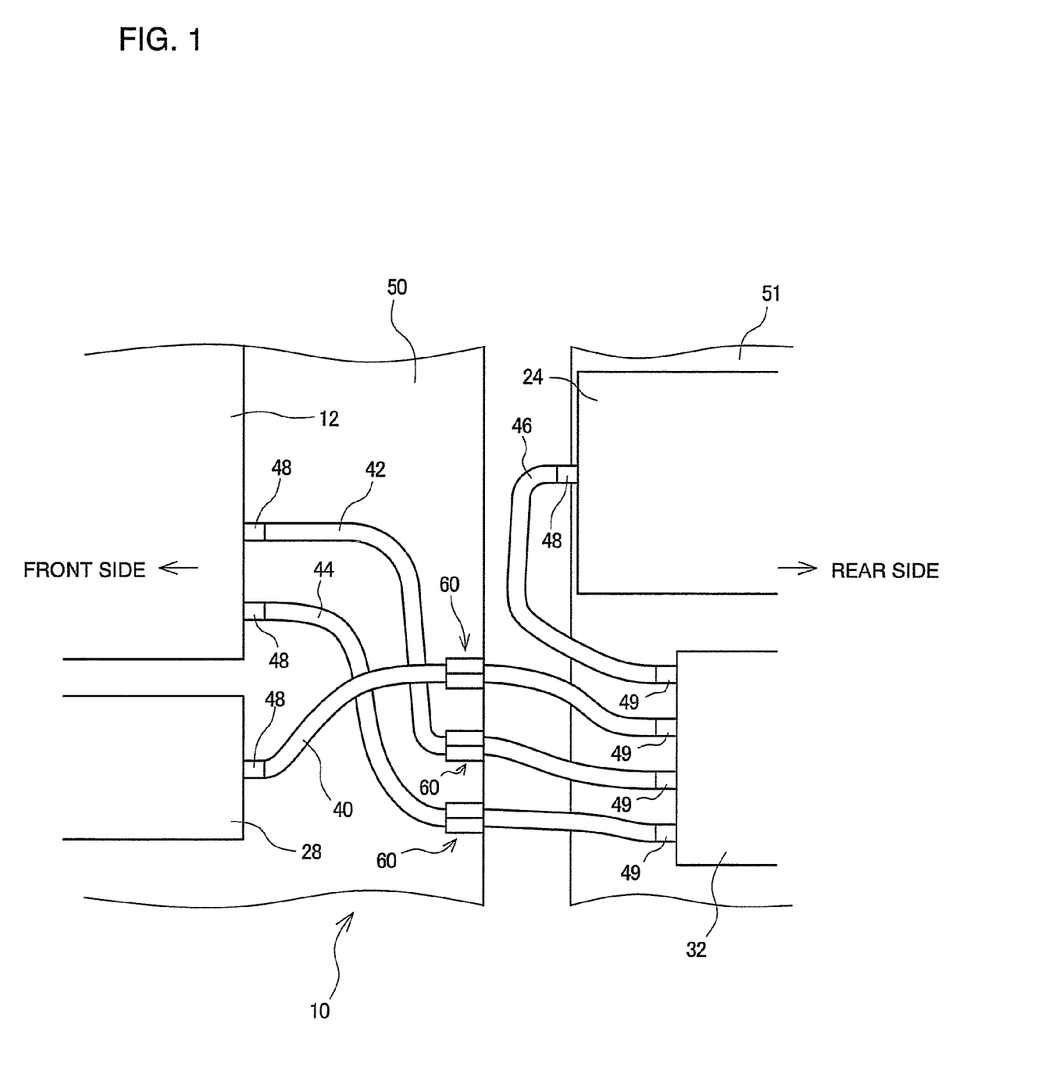
FIG. 1 is a plan view of a gas piping system for a fuel cell according to an embodiment of the present invention.
Figure 2:
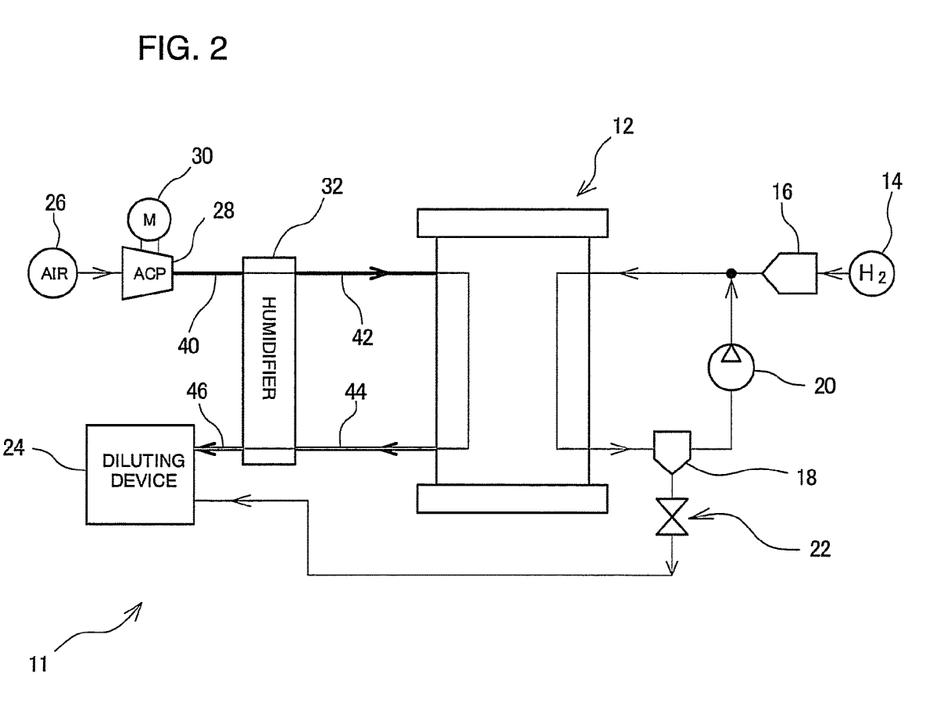
FIG. 2 is a diagram for explaining a general configuration of a fuel cell system in which the gas piping system for a fuel cell according to the embodiment of the present invention is applied.

FIG. 1 is a plan view of a gas piping system for a fuel cell 10 placed under a floor of a vehicle. Hereinafter, the gas piping system for a fuel cell 10 will be simply referred to as the gas piping system 10. FIG. 2 is a diagram for explaining a general configuration of a fuel cell system 11 to which the gas piping system 10 is applied. In FIG. 2, gas pipes 40, 42, 44, and 46 which are components of the gas piping system 10 are depicted with heavy solid lines, to distinguish them from other piping components. The gas piping system 10 is, as shown in FIGS. 1 and 2, a system in which the gas pipes 40, 42, 44, and 46 are arranged to provide connection among a fuel cell stack 12, an air compressor (ACP) 28, a humidifier 32, and a diluting device 24, and locations of the gas pipes 40, 42, 44, and 46 are fixed to a suspension member 50 which is a fixing portion of a vehicle body.

Firstly, the fuel cell system 11 to which the gas piping system 10 is applied will be described with reference to FIG. 2, and secondly, contents of the gas piping system 10 will be described in details.

FIG. 2 is a configuration diagram of the fuel cell system 11. The fuel cell system 11 is configured to include a fuel cell body, which is referred to as the fuel cell stack 12 comprising a stack of a plurality of fuel cells, components disposed on an anode side of the fuel cell stack 12 to supply hydrogen gas, and components disposed on a cathode side of the fuel cell stack 12 to supply air.

The fuel cell stack 12 is obtained by stacking a plurality of combined single cells, and in each of the single cells, separators are disposed on both sides of a Membrane Electrode Assembly (MEA) in which catalytic electrode layers are disposed on both sides of an electrolytic film being a solid polymer membrane, to thereby sandwich the MEA between the separators. The fuel cell stack 12 has a function of extracting necessary power generated by a fuel cell chemical reaction which is caused through the electrolytic film by supplying a fuel gas such as hydrogen to the anode side, and supplying an oxidation gas including oxygen such as air, for example, to the cathode side.

A hydrogen gas source 14 of the anode side is a tank from which hydrogen used as the fuel gas is supplied. A regulator 16 connected to the hydrogen gas source 14 has a function of controlling a pressure and a flow rate of the gas from the hydrogen gas source 14 to appropriate levels. An output port of the regulator 16 is connected to an anode side inlet of the fuel cell stack 12, to thereby supply the fuel cell stack 12 with the fuel gas whose pressure and flow rate have been controlled as appropriate.

A flow divider 18 connected to an anode side outlet of the fuel cell stack 12 is used, when an impurity gas concentration in an exhaust gas obtained from the anode side outlet becomes higher, for delivering the exhaust gas through an exhaust valve 22 to the diluting device 24. The exhaust gas obtained at this time is a hydrogen gas containing water of a reaction product in addition to nitrogen. On the other hand, a circulation pressure increasing device 20 which is further installed after the flow divider 18 between the flow divider 18 and the anode side inlet is a hydrogen pump which has a function of increasing a hydrogen partial pressure of the gas returned from the anode side outlet, and delivering the gas having the increased hydrogen partial pressure back to the anode side inlet for reuse.

An oxidation gas source 26 of the cathode side may, in practice, be implemented using atmospheric air. The air compressor (ACP) 28 disposed after the oxidation gas source 26 is a gas pressure increasing device in which a motor 30 performs volume compression of an oxidation gas to increase the pressure of the oxidation gas. The ACP 28 has a function of changing its rotational speed (the number of revolutions per minute) to thereby provide a predetermined amount of oxidation gas. In other words, when a required flow rate of the oxidation gas is high, the rotational speed of the motor 30 is increased, and conversely when the required flow rate of the oxidation gas is low, the rotational speed of the motor 30 is decreased.

The humidifier 32 has a function of appropriately humidifying the oxidation gas to efficiently cause the fuel cell reaction in the fuel cell stack 12. The oxidation gas is supplied from the ACP 28 via a flow path formed of the gas pipe 40 to the humidifier 32. The oxidation gas appropriately humidified by the humidifier 32 is supplied via a flow path formed of the gas pipe 42 to a cathode side inlet of the fuel cell stack 12, and discharged out from a cathode side outlet. At the time of discharging, water of a reaction product is also discharged along with exhaust air. Because the temperature of the fuel cell stack 12 is elevated by the reaction, the water to be discharged is in the form of vapor. A spent oxidation gas containing the water vapor is supplied via a flow path formed of the gas pipe 44 to the humidifier 32 and used to appropriately humidify the oxidation gas which is sent from the above-described ACP 28 and is not yet used. Thus, a gas exchanger using a so-called hollow fiber may be employed as the humidifier 32 having the function of providing appropriate moisture to the oxidation gas. Further, the spent oxidation gas having passed through the humidifier 32 is supplied via a flow path formed of the gas pipe 46 to the diluting device 24 in which the spent oxidation gas is used as a dilution gas for diluting the spent fuel gas discharged from the exhaust valve 22.

The diluting device 24 is a buffer container for collecting both hydrogen mixed drainage from the exhaust valve 22 of the anode side and exhaust air which is mixed with the water vapor of the cathode side and further mixed with hydrogen leaking through the MEA, and diluting them with the spent oxidation gas supplied from the humidifier 32 to thereby discharge the drainage and the exhaust air at an appropriate hydrogen concentration to the outside.

In the fuel cell system 11 as described above, the gas pipes are used for fuel gas feeding, oxidation gas feeding, spent fuel gas discharge, spent oxidation gas discharge, and other purposes. As examples of such gas pipes, in FIG. 2, the gas pipes 40, 42, 44, and 46 are depicted with heavy solid lines.

Returning back to FIG. 1, there are shown the gas pipes 40, 42, 44, and 46. FIG. 1 is a diagram showing a state of the gas pipes 40, 42, 44, and 46 arranged in a case where the fuel cell system 11 illustrated with respect to FIG. 2 is installed under the floor of a vehicle. Here, the fuel cell stack 12 and the ACP 28 are disposed on the suspension member 50 which is fixed to a body of the vehicle, while the humidifier 32 and the diluting device 24 are disposed on an underfloor member 51 which is similarly fixed to the body of the vehicle. Then, the fuel cell stack 12, the ACP 28, the humidifier 32, and the diluting device 24 are connected through the gas pipes 40, 42, 44, and 46. In FIG. 1, a direction toward a front side, which is an anterior side of the vehicle, and a direction toward a rear side, which is a posterior side of the vehicle, are shown. Because the suspension member 50 is located closer to the front side than the underfloor member 51, the fuel cell stack 12 and the ACP 28 are accordingly positioned closer to the front side than the humidifier 32 and the diluting device 24.

As shown in FIG. 1, each of the gas pipes 40, 42, 44, and 46 includes connection ends 48 and 49 in both end portions thereof, and is connected tightly, so as to prevent gas leakage, through the connection ends 48 and 49 to each gas port of the fuel cell stack 12, the ACP 28, the humidifier 32, and the diluting device 24. Further, in the example of FIG. 1, the gas pipes 40, 42, and 44 are fixedly mounted on the suspension member 50 which is the fixing portion of the vehicle by means of fixing tools 60. As shown in FIG. 1, each of the gas pipes 40, 42, 44, and 46 is not a straight pipeline. Therefore, in each of the gas pipes 40, 42, 44, and 46, locations of the connection ends 48 and 49 in the two end portions, and a location of the fixing tool 60, do not exist on a straight line, and have an offset positional relationship.

Figure 3:
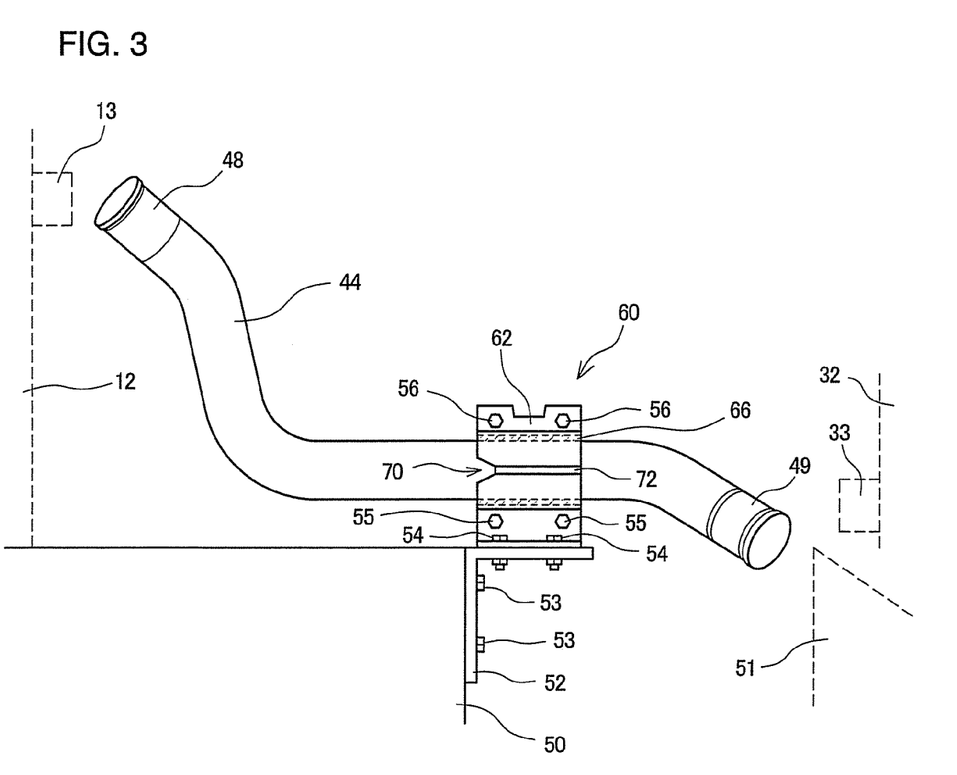
FIG. 3 is a front view showing a state of fixing by means of a fixing tool in the embodiment of the present invention.
Figure 4:
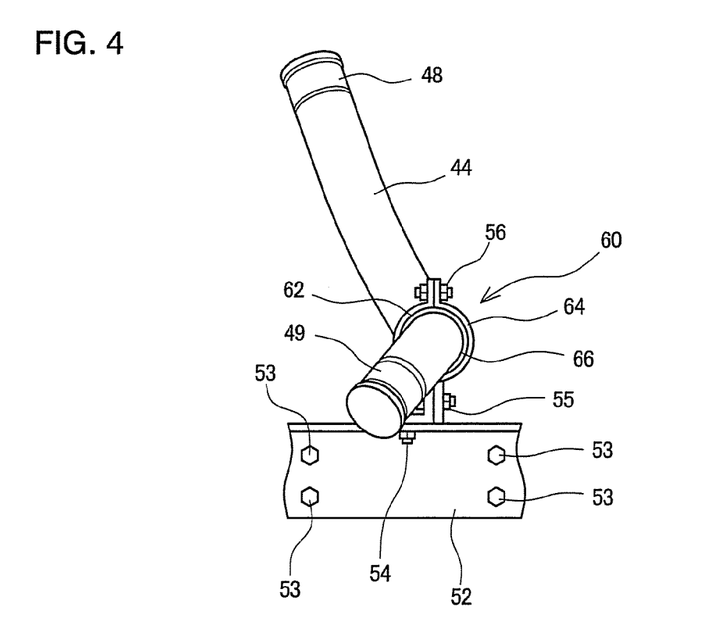
FIG. 4 is a side view showing the state of fixing by means of the fixing tool in the embodiment of the present invention.

FIGS. 3 and 4 are diagrams showing a state of fixation achieved by the fixing tool 60, and the gas pipe 44 is illustrated as a representative example for explanation. FIGS. 3 and 4 respectively illustrate the state viewed from different directions shifted by 90 degrees, and if FIG. 3 is defined as a front view, FIG. 4 represents a side view. One connection end 48 of the gas pipe 44 is connected to a port 13 of the fuel cell stack 12 which is fixedly mounted on the suspension member 50, while the other connection end 49 of the gas pipe 44 is connected to a port 33 of the diluting device 24 which is fixedly mounted on the underfloor member 51. Then, using the fixing tool 60, the gas pipe 44 is fixed, at a certain position between the connection end 48 on one side and the connection end 49 on the other side, to the suspension member 50 which is the fixing portion of the vehicle.

It should be noted that in the fuel cell stack 12, as described in FIG. 1, the port 13 is the outlet from which the spent oxidation gas mixed with water vapor is discharged, while in the humidifier 32, the port 13 is a port into which the spent oxidation gas mixed with water vapor is supplied. Therefore, the gas pipe 44 functions as a flow path having a capability of delivering the spent oxidation gas including the produced water in the form of water vapor generated through the fuel cell chemical reaction in the fuel cell stack 12 from the fuel cell stack 12 to the humidifier 32.

The gas pipe 44 is a corrosion resistant metallic pipe designed to withstand corrosion due to dissolved fluorine ions from the solid polymer membrane of the component of the fuel cell stack 12, and formed of stainless steel which has no nickel component. Specifically, ferritic stainless steel of JIS standard SUS 43 series may be used. As one example of dimensions, the outside diameter of the gas pipe 44 may be approximately 30 mm, while the inside diameter of the gas pipe 44 may be approximately 28 mm. The sizes may, of course, be defined to other dimensions.

The fixing tool 60 is composed of two bracket members 62 and 64 shaped along a circular outline of the gas pipe 44, and an elastic member 66 disposed between an outer circumference of the gas pipe 44 and the bracket members 62 and 64. The two bracket members 62 and 64 are configured so as to have a bore geometry for supporting the circular outline of the gas pipe 44 when the bracket members 62 and 64 are joined. Then, after the elastic member 66 is disposed between the bore geometry and the outer circumference of the gas pipe 44, the bracket members 62 and 64 are integrated into one unit using a plurality of bolts/nuts 55 and 56. The integrated fixing tool 60 in which the gas pipe 44 is supported is mounted via an attachment member 52 to the suspension member 50 being the fixing portion of the vehicle body by a plurality of bolts/nuts 53 and 54.

Figure 5:
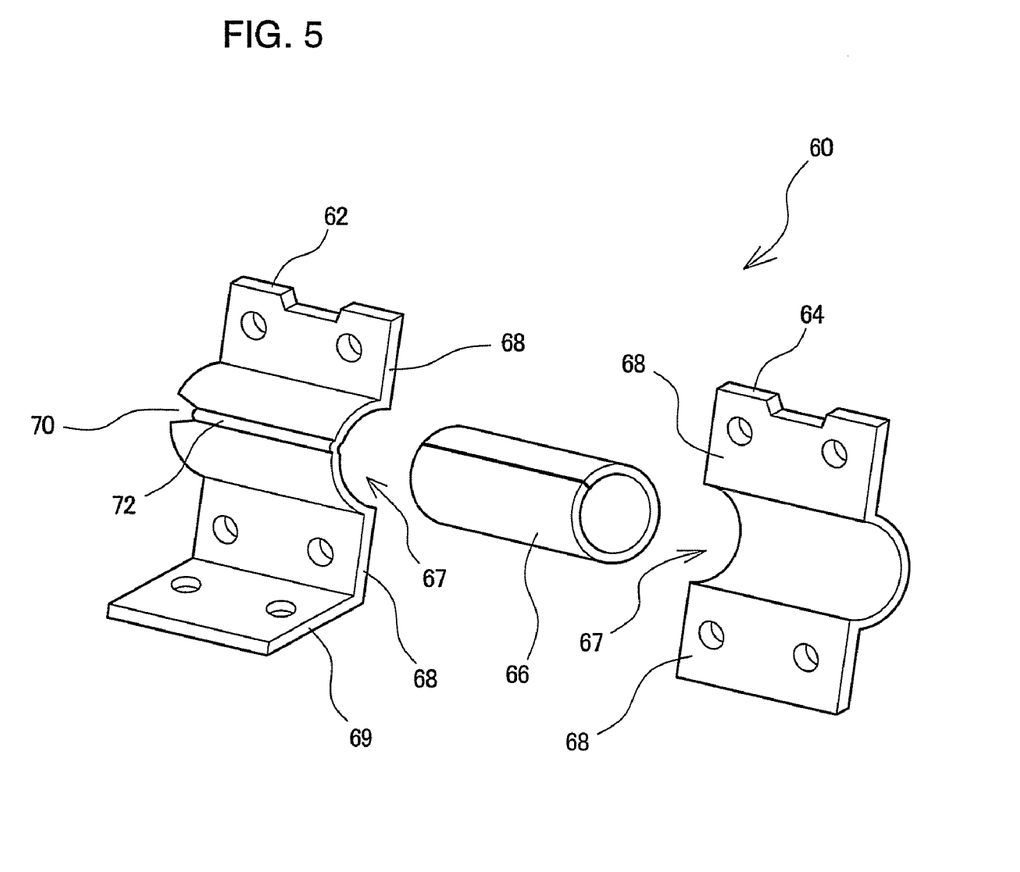
FIG. 5 is an exploded view of the fixing tool in the embodiment according to the present invention.

FIG. 5 is an exploded view of the fixing tool 60. The bracket member 62 and the bracket member 64 are components each having a part shaped like a half ring in cross section, and take the form of one pipe when the bracket members 62 and 64 are joined together in such a manner that the half-ring-shaped parts 67 face each other. The inside diameter of the joined form of the one pipe portion is set to a size slightly smaller than the outside diameter of the gas pipe 44.

The bracket member 64 has a shape composed of the half-ring-shaped part 67 and flat parts 68 located on both sides of the half-ring-shaped part 67. On the other hand, in the bracket member 62, one of the flat parts 68 is bent to additionally provide a projected part 69. The projected part 69 is used, as described in FIG. 3, for connection and fixation to the attachment member 52 using fixing means such as the bolts/nuts 54. Each corresponding flat part 68 of the bracket members 62 and 64 is used as a joint surface where the two bracket members 62 and 64 are joined together through appropriate fastening means such as a plurality of bolts/nuts 55 and 56 as described in FIG. 3.

As the fastening means for integrating the two bracket members 62 and 64 into one unit, although caulking, swaging, or the like instead of the bolts/nuts may be used, means which is, at any rate, able to achieve the fastening at normal room temperature without having to use a special heating treatment is selected. The connection and fixation between the attachment member 52 and the projected part 69 of the bracket member 62 may be performed by means of caulking, swaging, or the like instead of the bolts/nuts, or may be performed by means of welding or the like, as long as the gas pipe 44 is not thermally affected. For example, the bracket member 62 may be previously attached, by welding, to the attachment member 52 having been secured to the suspension member 50 in advance, and the bracket member 64 may be fixed later via the gas pipe 44 and the elastic member 66 by the fastening means.

The bracket members 62 and 64 including the half-ring-shaped parts 67, the flat parts 68, and the protruded part 69 as described above may be obtained through an appropriate forming technique such as bending or pressing of sheet metal. For example, the bracket members 62 and 64 including the half-ring-shaped parts 67, the flat parts 68, and the projected part 69 may be obtained by forming a steel plate having an appropriate plate thickness and strength. When the outside diameter of the gas pipe 44 is assumed to be approximately 30 mm in the above-described example, a steel plate having a width of approximately 60 mm, which is twice the outside diameter of the gas pipe 44, and a plate thickness of approximately 1 mm may be formed into a designated shape through a process in which a width direction of the steel plate is defined as an axial direction of an arc of the half-ring-shaped part. Then, the steel plate formed into the designated shape may be used as the bracket members 62 and 64.

In addition to the half-ring-shaped part 67, the flat parts 68, and the projected part 69 as described above, the bracket member 62 is provided with a bead 72 formed on a vertex of the half-ring-shaped part 67, and a notched portion 70 formed on a region corresponding to one end of the bead 72. The bracket member 64 has neither the bead 72 nor the notched portion 70. The bead 72 and the notched portion 70 may, of course, be provided to the bracket member 64, as appropriate.

The bead 72 is a projection linearly arranged along the vertex of the half-ring-shaped part 67. The bead 72 has a function of establishing a region which differs in strength from other regions in the bracket member 62, and more specifically, has a guiding function of forcing a crack that appears in the notched portion 70 due to an excessive external force to propagate in a direction along the bead 72. A plate thickness of the projected region is defined to a thickness equal to or smaller than that of other regions. For instance, when it is assumed in the above-described example that the gas pipe 44 is of approximately 30 mm in outside diameter while an inside radius of the half-ring-shaped part 67 is approximately 14 mm, the bead 72 may be a projection formed by adding a small bend of approximately 1 mm in radius along the vertex of the half-ring-shaped part 67. A direction along which the bead 72 extends is an axial direction of the gas pipe 44 supported by the bracket members 62 and 64.

The notched portion 70 provided on one end of the bead 72 is a partially cut out region of the bracket member 62. The notched portion 70 has a function of causing the bead 72 to be easily ruptured by external force when the external force is applied via the gas pipe 44 to the fixing tool 60. In other words, the notched portion 70 is a strength decreased region intentionally provided to the bracket member 62. For the notched portion 70 as described above, a triangular notch that is gradually narrowed toward the bead 72 may be used.

Here, it should be noted that the one end of the bead 72 refers to a connection end 48 side located on one side of the gas pipe 44 when the gas pipe 44 is supported by the bracket members 62 and 64. Namely, the one end is an end part which will be situated on a fuel cell stack 12 side when the gas pipe 44 is supported by the bracket members 62 and 64. The notched portion 70 is not provided on the other end of the bead 72, i.e. an end part which will be situated on a humidifier 32 side when the gas pipe 44 is supported by the bracket members 62 and 64. As described with reference to FIG. 1, the fuel cell stack 12 is placed closer to the front of the vehicle than the humidifier 32, and when the vehicle is subjected to impact from in front of the vehicle, the fuel cell stack 12 receives the external force in advance of the humidifier 32. The notched portion 70 is disposed on the end part which will be situated on the fuel cell stack 12 side where the external force, exerted when the vehicle is subjected to impact, is received earlier.

The strength of the notched portion 70, i.e. a magnitude of strength at which the notched portion 70 is ruptured when an external force, acting to withdraw the fixing tool 60 that is fixed to the suspension member 50 from the suspension member 50, is exerted through the gas pipe 44, may be found from experimentation or the like based on specific shapes of the notched portion 70 and the bead 72, or other factors. In general, a smaller rupturing strength can be obtained by defining a sharper acute angle to a vertex angle of a triangular shape of the notched portion 70.

The elastic member 66 is disposed between a ring-shaped part constructed by the joined bracket members 62 and 64 and the outer circumference of the gas pipe 44, and has a function of preventing rotation or other movement of the gas pipe 44. If the outer circumference of the gas pipe 44 is only held between the bracket members 62 and 64 composed of a metallic material without the use of the elastic member 66, rotation relative to an axial direction and movement along the axial direction of the gas pipe 44 will not be restrained tightly. The elastic member 66 can apply, using its own elasticity, appropriate friction against the outer circumference of the gas pipe 44, to thereby suitably restrain the gas pipe 44 from rotating relative to the axial direction and moving along the axial direction. In addition, when an external force that exceeds a restraint force resulting from a frictional force is exerted, the elastic member 66 can moderately allow the gas pipe 44 to rotate relative to the axial direction or move along the axial direction. The magnitude of the restraint force resulting from the frictional force can be predetermined by properly establishing an elastic modulus of the elastic member 66, a compressibility ratio of the elastic member 66 attained during insertion of the elastic member 66 between the bracket members 62, 64 and the gas pipe 44, a size of the elastic member 66, a coefficient of friction between the elastic member 66 and the bracket members 62 and 64, a coefficient of friction between the elastic member 66 and the gas pipe 44, and the like.

A material whose elastic modulus is sufficiently lower than that of metal may be used for the above-described elastic member 66. Preferably, a material having viscoelasticity is desired. For example, a plastic rubber sheet may be used. Specifically, a rectangular-shaped plastic rubber sheet of an appropriate thickness, which is formed so as to have a width dimension equal to the width of the bracket members 62 and 64, and a length dimension equal to an outer circumferential length of the gas pipe 44, may be arranged for use as the elastic member 66 by winding the rectangular-shaped plastic rubber sheet around the outer circumference of the gas pipe 44. The plastic rubber sheet may be composed of foamed plastic rubber such as, for example, ethylene-propylene rubber (EPM) or ethylene-propylene-diene rubber (EPDM) obtained by adding a third component of a diene component to the EPM. In the above-described example, an EPDM sheet of approximately 60 mm in width, approximately 100 mm in length, and approximately 1 mm in thickness may be used.

The action of the gas piping system 10 for a fuel cell configured as described above, in particular, the action of the fixing tool 60, will be described. Explanation is provided using reference numerals indicated in FIGS. 1 to 5 below. As has been described above, the fixing tool 60 is a component for holding the outer circumference of the gas pipe 44 via the elastic member 66 by means of the bracket members 62 and 64 and fixing the gas pipe 44 held between the bracket members 62 and 64 to the suspension member 50 being the fixing portion of the vehicle. Under normal conditions, the fixing tool 60 moderately restrains rotation relative to the axial direction and movement along the axial direction of the gas pipe 44 through the use of the frictional force exerted by the function of the elastic member 66, to thereby suppress the gas pipe 44, for example, from wobbling due to shaking of the vehicle during driving.

Further, when the external force that exceeds the restraint force resulting from the frictional force is applied, the gas pipe 44 is allowed to rotate relative to the axial direction or move along the axial direction, as appropriate. Then, when the external force disappears, axial rotation or axial movement of the gas pipe 44 can be appropriately restrained in its rotated or moved position or restored its original place by the restraint force resulting from the frictional force. In other words, the fixing tool 60 has the effect of setting and securing the position of the gas pipe 44 in a state where the external force is tolerated to a certain extent.

Figure 6A:
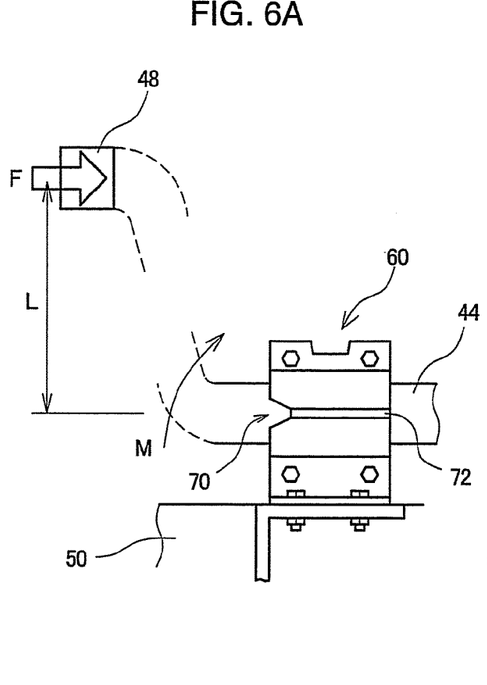
FIG. 6 is a diagram for explaining the action of the fixing tool obtained when an excessive external force F is exerted on a connection end of a gas pipe in the embodiment according to the present invention.
Figure 6B:
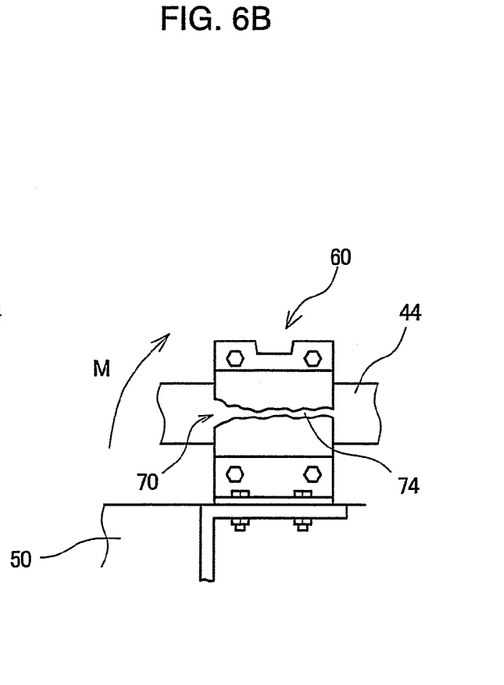

Further, the fixing tool 60 has a function that protects the gas pipe 44 against deformation or damage due to an excessive external force, by the action of the bead 72 and the notched portion 70. The function of the fixing tool 60 will be described with reference to FIG. 6A and FIG. 6B. FIG. 6A shows a situation where an excessive external force F is applied to the connection end 48 of the gas pipe 44, and FIG. 6B shows a situation where the fixing tool 60 is ruptured by the excessive external force to thereby protect the gas pipe 44 from being deformed or damaged.

Because the gas pipe 44 is not a straight pipeline as described with reference to FIG. 1, there is an offset L between locations of the connection end 48 and the fixing tool 60. The offset L does not represents a difference of linear distance between the location of the connection end 48 and the location of the fixing tool 60, but represents the presence of separation in distance between the location of the connection end 48 and the location of the fixing tool 60 along a direction perpendicular to a direction of the external force F. Therefore, the offset L and the external force F produce a bending moment M=F×L on the gas pipe 44 at the location of the fixing tool 60. This situation is shown in FIG. 6A.

The bending moment M acts on the fixing tool 60 as an external force that separates the fixing tool 60 away from the suspension member 50, being the fixing portion. When the external force is excessively large, a crack appears on the notched portion 70 which is an area of low strength in the fixing tool 60, grows along the bead 72, and finally causes the fixing tool 60 to rupture. FIG. 6B shows a state of the grown crack resulting in a ruptured surface 74.

As described above, when stainless steel containing no nickel is used as a material of the gas pipe, and fixation of the gas pipe to the fixing portion is performed using the fixing tool at normal room temperature, nickel dissolution can be prevented from occurring due to fluorine ions contained in produced water in the fuel cell stack, and sensitization of grain boundary corrosion resulting from a high-temperature treatment can also be prevented from occurring. Further, because the elastic member is disposed between the fixing tool and the gas pipe, the gas pipe can be positioned and secured in the state capable of tolerating the external force to a certain extent. In addition, because the notched portion or the like is provided on the fixing tool, the fixing tool can be self-ruptured when an excessive external force is exerted on components that constitute the fuel cell system, to thereby prevent the gas pipe against deformation or damage.

What is claimed is:

1. A gas piping system for a fuel cell comprising:
   a gas pipe formed of stainless steel containing no nickel component; and
   a fixing tool for fixing the gas pipe to a fixing portion at normal room temperature,
   wherein the gas pipe includes a connection end which is connected to a component of a fuel cell system and configured to have an offset between a connecting location of the connection end and a location of the fixing tool, and
   wherein the fixing tool comprises a bead, said bead comprising a raised portion on an outer surface of said fixing tool, and the fixing tool includes said bead and a notched portion provided on a longitudinal end of the bead, the bead and the notched portion are configured to be ruptured by an external force when the external force is applied to the connection end of the gas pipe.

2. The gas piping system for a fuel cell according to claim 1, further comprising: an elastic member disposed between the gas pipe and the fixing tool.

3. The gas piping system for a fuel cell according to claim 1, wherein the fixing tool comprises a first bracket member and a second bracket member.

4. The gas piping system for a fuel cell according to claim 3, wherein each of the first and second bracket members comprise a half-ring portion.

5. The gas piping system for a fuel cell according to claim 4, wherein the first and second bracket members are fixed together such that the half-ring portions face each other.

6. The gas piping system for a fuel cell according to claim 3, wherein the first and second bracket members are adapted to receive the gas pipe therebetween.

7. The gas piping system for a fuel cell according to claim 3, wherein the first bracket member includes the notched portion, said notched portion comprising a partially cut-out region.

8. The gas piping system for a fuel cell according to claim 3, wherein the first bracket member comprises said bead, said bead comprising said raised portion on the outer surface of the first bracket member.

9. The gas piping system for a fuel cell according to claim 8, wherein said bead is formed on a vertex of the half-ring portion.

10. The gas piping system for a fuel cell according to claim 9, wherein said bead is a linear raised portion extending longitudinally along the vertex.

11. The gas piping system for a fuel cell according to claim 6, further comprising a cylindrical elastic member between the gas pipe and the first and second bracket members.

12. The gas piping system for a fuel cell according to claim 3, wherein the first and second bracket members are connected by mechanical fixation.

13. The gas piping system for a fuel cell according to claim 1, wherein the stainless steel forming the pipe is JIS standard SUS 43 series.

14. The gas piping system for a fuel cell according to claim 2, wherein the elastic member comprises plastic rubber.

15. A system comprising:
a gas piping system for a fuel cell comprising:
- a gas pipe formed of stainless steel containing no nickel component; and
- a fixing tool for fixing the gas pipe to a fixing portion at normal room temperature,
- wherein the gas pipe includes a connection end which is connected to a component of a fuel cell system and configured to have an offset between a connecting location of the connection end and a location of the fixing tool, and
- wherein the fixing tool comprises a bead, said bead comprising a raised portion on an outer surface of said fixing tool, and the fixing tool includes said bead and a notched portion provided on a longitudinal end of the bead, the bead and the notched portion are configured to be ruptured by an external force when the external force is applied to the connection end of the gas pipe; and a solid polymer electrolyte fuel cell.

16. A fuel-cell-equipped vehicle comprising:
a fuel cell system wherein the fuel cell system comprises a gas piping system for a fuel cell comprising:
- a gas pipe formed of stainless steel containing no nickel component; and
- a fixing tool for fixing the gas pipe to a fixing portion at normal room temperature,
- wherein the gas pipe includes a connection end which is connected to a component of a fuel cell system and configured to have an offset between a connecting location of the connection end and a location of the fixing tool, and
- wherein the fixing tool comprises a bead, said bead comprising a raised portion on an outer surface of said fixing tool, and the fixing tool includes said bead and a notched portion provided on a longitudinal end of the bead, the bead and the notched portion are configured to be ruptured by an external force when the external force is applied to the connection end of the gas pipe;
and
- a portion of the gas pipe fixed to the fixing tool is disposed along a longitudinal direction of the vehicle, and
- the notched portion is provided at a region located on an anterior side in the longitudinal direction of the vehicle.

17. The fuel-cell-equipped vehicle according to claim 16, wherein the fixing tool has said bead on said outer surface provided so as to extend along the longitudinal direction of the vehicle.

* * * * *